(12) United States Patent
DeLatorre (10) Patent No.: US 9,035,888 B1
(45) Date of Patent: May 19, 2015

(54) USER INPUT METHOD FOR MOBILE STATION HAVING A TOUCHSCREEN DISPLAY

(75) Inventor: Renato DeLatorre, Palisades Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 620 days.

(21) Appl. No.: 12/905,727

(22) Filed: Oct. 15, 2010

(51) Int. Cl.
*G06F 3/041* (2006.01)
*G06F 3/0488* (2013.01)

(52) U.S. Cl.
CPC .................. *G06F 3/04886* (2013.01)

(58) Field of Classification Search
USPC ................................................. 345/173–179
See application file for complete search history.

(56) References Cited

U.S. PATENT DOCUMENTS

| | | | |
|---|---|---|---|
| 2004/0160419 A1* | 8/2004 | Padgitt | 345/173 |
| 2005/0225538 A1* | 10/2005 | Verhaegh | 345/173 |
| 2006/0085757 A1* | 4/2006 | Andre et al. | 715/771 |
| 2008/0082934 A1 | 4/2008 | Kocienda et al. | |
| 2008/0098331 A1* | 4/2008 | Novick et al. | 715/835 |
| 2009/0167706 A1* | 7/2009 | Tan et al. | 345/173 |
| 2009/0303200 A1* | 12/2009 | Grad | 345/173 |
| 2010/0026651 A1* | 2/2010 | Soloviev | 345/173 |
| 2010/0033433 A1* | 2/2010 | Utz et al. | 345/168 |
| 2010/0262928 A1 | 10/2010 | Abbott | |
| 2011/0242138 A1* | 10/2011 | Tribble | 345/663 |
| 2012/0120016 A1* | 5/2012 | Mittal et al. | 345/173 |

* cited by examiner

*Primary Examiner* — Alexander Eisen
*Assistant Examiner* — Cory Almeida (57) ABSTRACT

A mobile station having a touchscreen display and function key allows users to quickly input data. The mobile station displays key input sectors including displayed representations of data characters for the user to select. Upon touch by the user, the mobile station senses the location of the touch and highlights the displayed representation of the corresponding data character. While the data character is highlighted, the user further activates the mobile station and the mobile station senses the user's selection of the highlighted data character. The mobile station processes data corresponding to the selected data character as the user input data.

20 Claims, 6 Drawing Sheets

USER INPUT METHOD FOR MOBILE STATION HAVING A TOUCHSCREEN DISPLAY

TECHNICAL FIELD

The present subject matter relates to techniques and equipment that provide an enhanced interface for user input of data into a mobile station.

BACKGROUND

In recent years, mobile communication services have expanded and increased in popularity around the world. Many advanced networks offer wireless mobile communication service for voice calls, text and/or multimedia mobile messaging services and data communications. The data services, for example, enable surfing the world wide web, e.g. via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks from their mobile stations.

Users typically employ a keyboard or a touchscreen on the mobile stations to input data by hunting for and selecting one data character at a time. Because of the limited size of the keypad of many mobile stations, selection of characters using more than one or two fingers can be inefficient. For example, the speed of input of data may limited to the speed at which the user can find a particular character and select the character before repeating the process for the next character. This process may be slowed further by the need to intermittently find, select and activate associate function-change keys (e.g. Shift, Alt, Fn) to change the function of a selected character key before actuation of the character key.

Hence, a need exists for an improved method of inputting data, for example, which provides a mobile station user with an enhanced interface for selecting data characters in rapid succession.

SUMMARY

The teachings herein alleviate one or more of the above noted problems by providing an interface that allows a mobile station user to select data characters rapidly, without lifting the user's thumbs (or other digits) from the mobile station.

Such a method may include the steps of displaying key input sectors on a touchscreen display, including displayed representations of data characters available for input by the user. When the user touches a location on the touchscreen display corresponding to one of the data characters displayed in one of the key input sectors, the touch may be sensed. In response to the sensed touch, representations of the data character may be highlighted at the displayed location in the corresponding key input sector. While the data character is highlighted, the mobile station may be further activated and sensed as the user's selection of the data character. Data corresponding to the selected data character may be processed as the user input data.

In some examples, additional data characters may be selected in a similar manner. In such examples, the steps for selecting the first data character and the second data character may overlap to at least some extent.

The disclosed techniques may be implemented in an appropriately configured touchscreen mobile station, for example, by appropriate programming for the processor(s) controlling the user interface on the mobile station.

As a result of the disclosed methods, mobile stations and program bearing articles, a user can more quickly enter data into a mobile station and communicate through a mobile network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The detailed description below relates to inputting data in a mobile station in an expeditious manner. The user places one or more digits (e.g., two thumbs) on key input sectors displayed on a touchscreen display of the mobile station. The key input sectors may resemble a modified QWERTY keyboard, with a left thumb being surrounded by letters available for typing with the left hand and the right thumb being surrounded by letters available for typing typed with the right hand. As the user moves the digits, various data characters (e.g., letters and/or numbers) are highlighted. When the user has highlighted the desired data character, further activation of the mobile station, for example, by using another digit (e.g., a forefinger) to activate a function key, allows the highlighted data character to be selected. The user can continue to select additional data characters in rapid succession without lifting the digit or digits (e.g., thumbs) from the touchscreen display.

Figure 1:
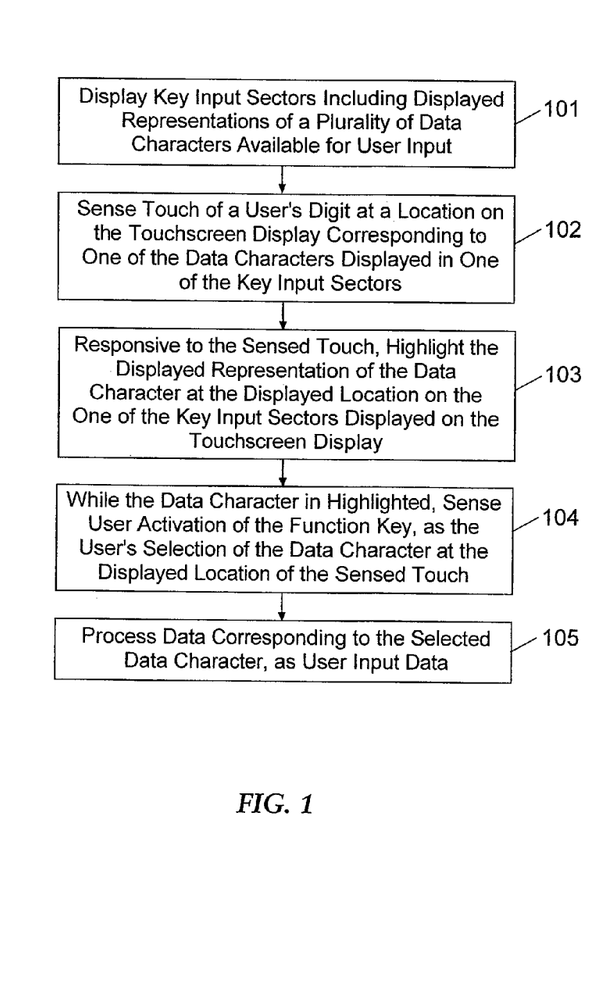
FIG. 1 is a flow chart of an exemplary method for receiving user input of data on a mobile station.
Figure 3A:
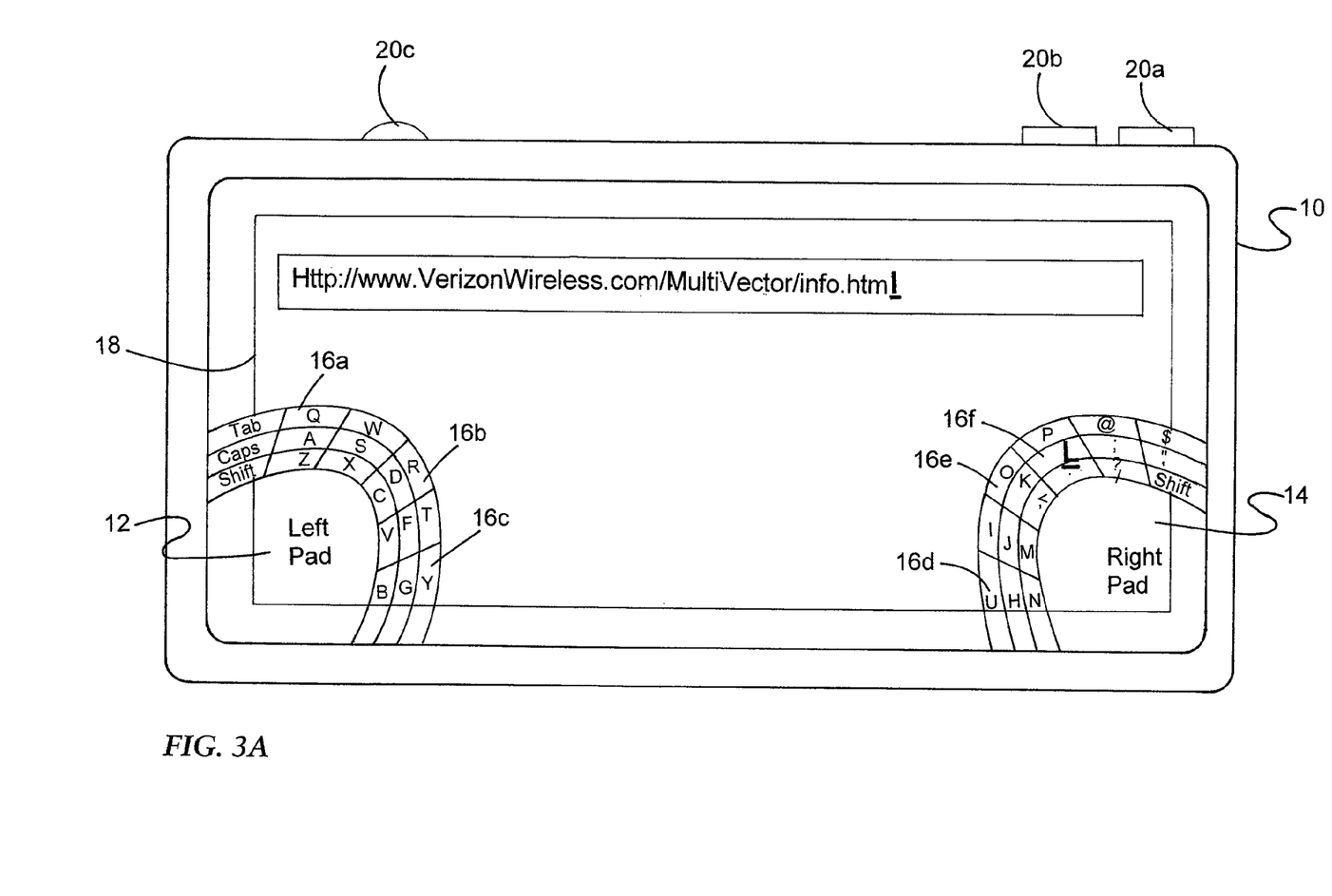
FIG. 3A is a frontal view of an exemplary mobile station having a touchscreen display and function key for entry of data by a user, when held in one orientation.
Figure 3B:
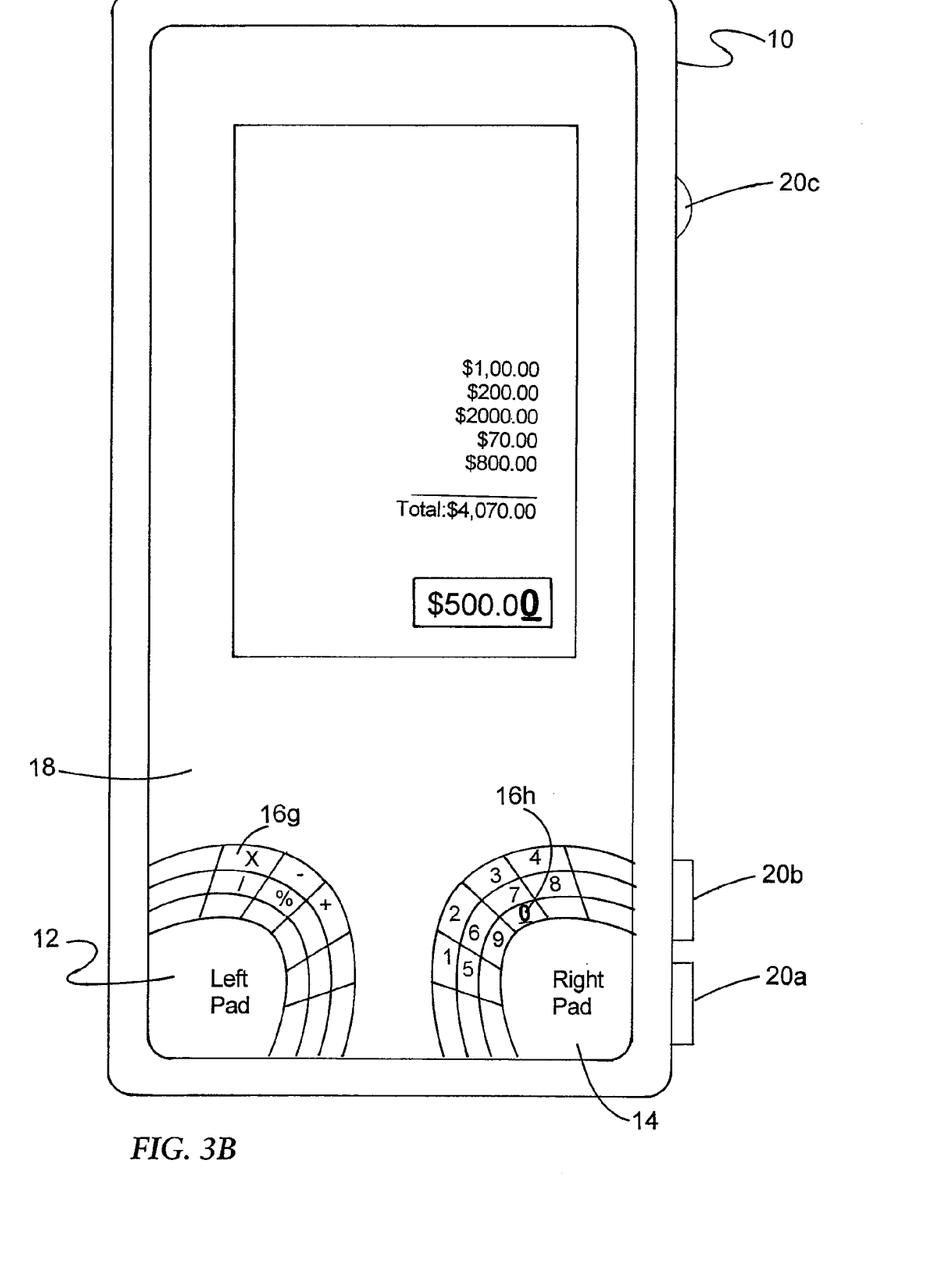
FIG. 3B is a frontal view of the exemplary mobile station having a touchscreen display and function key for entry of data by a user, when held in a different orientation.

Reference now is made in detail to the examples illustrated in the accompanying drawings and discussed below. FIG. 1 illustrates a method of receiving user input of data on a mobile station 10 such as that illustrated in later FIGS. 3A, 3B, 4, and 5. At step 101, the mobile station 10 displays key input sectors 12, 14 (see also FIGS. 3A and 3B). Each key input sector 12, 14 includes displayed representations of a number of data characters 16 (illustrated in FIGS. 3A and 3B as 16a-16h) available for user input. The step 101 of displaying key input sectors 12, 14 may include displaying the first key input sector 12 at a first location on a touchscreen display 18 for touch by a digit of the user's left hand. For example, as shown in FIGS. 3A and 3B, the first key input sector 12 may be in a lower left portion of the touchscreen display 18 of the mobile station 10. Likewise, the step 101 of displaying key input sectors 12, 14 may include displaying the second key input sector 14 at a second location on the touchscreen display 18 for touch by a digit of the user's right hand. For example, as shown in FIGS. 3A and 3B, the second key input sector 14 may be in a lower right portion of the touchscreen display 18 of the mobile station 10.

At step 102, the mobile station 10 senses touch of a user's digit (not shown) at a location on the touchscreen display 18 corresponding to one of the data characters 16 displayed in one of the key input sectors 12, 14. For example, as shown in FIG. 3A, data character L at 16f may be displayed in key input sector 14 and mobile station 10 may sense touch by the user at the location corresponding to the L data character 16f. At step 103, responsive to the sensed touch, the mobile station 10 highlights the displayed representation of the data character 16 at the displayed location in the one of the key input sectors 12, 14 displayed on the touchscreen display 18. Such highlighting may include changing the color, bolding, underlining, enlarging, encircling, repositioning, or any other change in appearance of the data character 16 relative to the other data characters in the corresponding key input sector. For example, as shown in FIG. 3A, data character L at 16f has been highlighted by enlargement, bolding, and underlining, while remaining in approximately the same position in key input sector 14.

At step 104, while the data character is highlighted, the mobile station 10 senses user activation of a function key 20 (illustrated in FIGS. 3A and 3B as 20a, 20b, and 20c), as the user's selection of the data character 16 at the displayed location of the sensed touch for data input to the mobile station 10. For example, as shown in FIG. 3A, function key 20a may be depressed while data character L at 16f is highlighted, indicating that data character L at 16f is the user's selection. Alternatively, additional pressure on touchscreen display 18 may be used in place of any of the illustrated function keys 20 for selection of the data character. At step 105, the mobile station 10 processes data corresponding to the selected data character 16 as the user input data.

For multiple consecutive inputs of the same character, e.g. to input two is as in the word call, the user could maintain touch of the desired data character L at 16f, which will remain highlighted indicate that data character L at 16f is the user's selection, and then activate the function key 20a the desired number of times.

If the user desires additional input of data of another character, continued interaction will cause mobile station 10 to sense another touch of one of the user's digits at a location on the touchscreen display 18 corresponding to a second data character 16. The second data character 16 may be displayed in the first key input sector 12 (e.g., data character Y at 16c), or the second data character 16 may be displayed in a different key input sector 14 (e.g., data character O at 16e). Responsive to the sensed next touch of the digit, the mobile station 10 may highlight the display of the second data character (e.g., data character Y at 16c) at the displayed location in the second key input sector 12 displayed on the touchscreen display 18. As the user keeps the digit on the second data character (e.g., data character Y at 16c), the second data character (e.g., data character Y at 16c) remains highlighted (not shown). While the second data character (e.g., data character Y at 16c) is highlighted, mobile station 10 senses user activation of the function key (e.g., 20a), as the user's selection of the second data character (e.g., data character Y at 16c). The mobile station 10 processes data corresponding to the second data character (e.g., data character Y at 16c), as another user input data. The process may be repeated as many times as desired for entry of any of a number of different data strings (e.g., text messages, website addresses, and email messages). Depending on the data characters 16 desired, the user may use the same digit (e.g., left thumb) to touch data characters (e.g., data characters R and Y at 16b and 16c, respectively) displayed on touchscreen display 18, or the user may alternate between digits in a manner similar to that used in typing on a full-sized QWERTY alphabetic keyboard. Similarly, the user may use one digit to activate the function key 20, or the user may alternate digits to activate the function key 20 in a manner similar to the use of digits used to activate the "Shift" key on a full-sized QWERTY alphabetic keyboard. Thus, one of the user's hands may be activating the function key (e.g., 20a) to select a first data character (e.g., data character Y at 16f), while a digit on the other hand is touching a subsequent data character (e.g., data character R at 16b). Thus, at least some of the steps described with regard to the first key input sector 14 and the first data character (e.g., data character Y at 16f) may overlap in time with the steps described with regard to the second key input sector 12 and the second data character (e.g., data character R at 16b).

In some instances, the user may desire to change from one set of data characters to another set of data characters. For example, the user may with to select an upper case letter followed by a lower case letter, and include symbols, punctuation marks, or numbers when inputting data. The user may additionally, or alternatively wish to select data characters for a different language (e.g., complex languages where words are character based instead of alphabetically based), different dialect, different font, or different position of data characters. Thus, any of a number of different sets of data characters may be available to the user for selection. The mobile station 10 may sense user input of a command to change the data characters 16 represented on the key input sectors 12, 14. Then, in response to the sensed command, the mobile station 10 may display in each key input sector 12, 14 representations of a different set of data characters (e.g., upper case letters instead of lower case letters). With this approach, the user may activate the function key (e.g., 20a), a second function key (e.g., 20b), or any other input to change data characters 16 displayed to the user for selection. In addition to use of function key 20, other methods of receiving user input commands to change the data characters may include menu commands, selection of a particular displayed data character (e.g., the "Shift" key), or other inputs by the user. In addition to providing different sets of data characters in response to user input of a command, the display of data characters may have a default value set by particular programs. For example, a calculator program may have two default sets of data characters for the key input sectors 12, 14, including numbers and mathematical operators. In contrast, a texting program may have default sets of data characters, including sets of letters. Depending on the particular program, data characters other than the default set may be available for selection by the user using function key 20 or other methods.

When different data characters 16 are displayed, the mobile station 10 may sense touch of the user's digit at a location on the touchscreen display 18 corresponding to an additional or different data character (e.g., numeric data character 0 at 16h) from among the different data characters 16 displayed in one of the key input sectors 12, 14. For example, as shown in FIG. 3B, numbers and math operation symbols, including numeric data character 0 at 16h, are represented in key input sectors 12, 14 instead of letters and other symbols represented in key input sectors 12, 14 of FIG. 3A. Responsive to the sensed touch, the mobile station 10 may highlight the display of the different data character (e.g., numeric data character 0 at 16h). While the different data character (e.g., numeric data character 0 at 16h) is highlighted, the mobile station 10 may sense user activation of the function key 20, as the user's selection of the different data character. The mobile station 10 may then process data corresponding to the selected different data character, as user input data.

Figure 2:
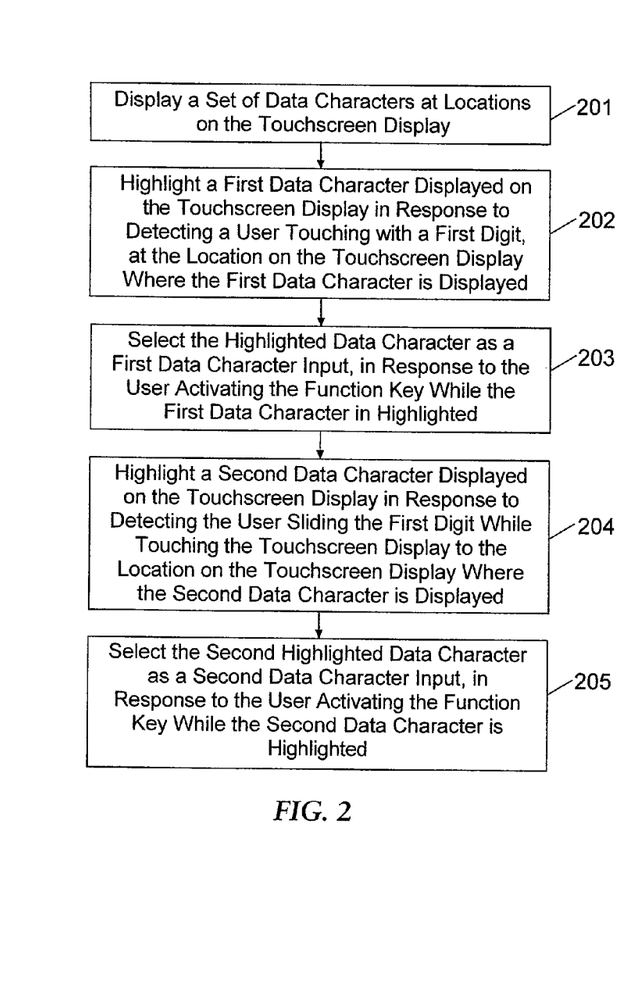
FIG. 2 is a flow chart of an exemplary method for entering data into a mobile station.

FIG. 2 illustrates a method of entering data into the mobile station 10 having the touchscreen display 18 and the function key 20 separate from the touchscreen display 18. At step 201, a set of data characters 16 is displayed at locations on the touchscreen display 18. At step 202, a first data character displayed on the touchscreen display 18 is highlighted in response to detecting the user touching with a first digit, at the location on the touchscreen display 18 where the first data character is displayed. For example, as shown in FIG. 3A, the data character L at 16f may be highlighted in response to the user touching, with a right thumb (not shown), the location on the touchscreen display 18 where the data character L at 16f is displayed.

At step 203, in response to the user activating the function key 20 while the first data character is highlighted, the highlighted data character is selected. For example, as shown in FIG. 3A, the user may activate the function key 20 while the data character L at 16f is highlighted. Activation of the function key 20 may be done with another digit on the same hand (e.g., a right forefinger), or by a digit on the other hand (e.g., a left forefinger). Depending on the type of function key 20, activation may involve depressing a button once (e.g., traditional function key), depressing a button multiple times (e.g., double-click), rotating a scrawl wheel (e.g., function key 20c), moving a track ball (not shown), or via any of a number of other indications of selection.

At step 204, in response to detecting the user sliding the first digit while touching the touchscreen display 18 to the location on the touchscreen display 18 where a second data character is displayed, the second data character is highlighted. For example, the user moves the first digit to the second data character (e.g., data character O at 16e) displayed on the touchscreen display 18, in a manner similar to movement of a mouse and the second data character (e.g., data character O at 16e) is highlighted. Thus, highlighting of various data characters 16 for selection may occur without the need to lift the digit from the mobile station 10, and without the hunt-and-peck method commonly employed with mobile stations.

At step 205, in response to the user activating the function key (e.g., 20a) while the second data character (e.g., data character O at 16e) is highlighted, the second highlighted data character is selected as a second data character input. Additional data characters may be highlighted and selected in a similar manner. For example, the user may activate the function key (e.g., 20a) while a third data character (e.g., data character Q at 16a) is highlighted on the touchscreen display 18 in response to the user touching the touchscreen display 18 with a second digit (e.g., a left thumb). The highlighted third data character (e.g., data character Q at 16a) may be selected in response to the user activating the function key (e.g., 20a). While the third data character is described as being selected after the first and second data characters, it should be understood that no particular order is implied. For example, the user may select a data character with one hand, then select another data character (described above as the third data character) with the other hand while sliding the digit on the first hand to the next data character (described above as the second data character).

Referring now to FIGS. 3A and 3B, the mobile station 10 may be a phone, a netbook, a notebook, a smart-phone, a tablet computer, or any other type of portable device, or may be incorporated into another device, such as a personal digital assistant (PDA) or the like. FIG. 3A illustrates a horizontal orientation for mobile station 10, while FIG. 3B illustrates a vertical orientation. While separate mobile stations 10 may have separate orientations, a single mobile station 10 may be programmed to allow for both orientations on a single device. Thus, in one mode, the mobile station 10 may show a horizontal input, e.g., for entry of website addresses, as shown in FIG. 3A; and in another mode, the same mobile station 10 may show a vertical input e.g., for calculator functioning, as shown in FIG. 3B.

The touchscreen display 18 provides a display of messages, menus or the like, call related information dialed by the user, calling party numbers, etc. At a high level, a touchscreen display is a device that displays information to a user and can detect occurrence and location of a touch on the area of the display. The touch may be an actual touch of the display device with a digit (e.g., finger or other digit), stylus or other object, although at least some touchscreens can also sense when the object is in close proximity to the screen. Use of a touchscreen display as part of the user interface enables a user to interact directly with the information presented on the display.

The function key 20 may be one or more keys which may be activated separately by one digit, by different alternating digits, or in combination to perform a number of different functions. Function key 20 may be a traditional function key, or may include any of a number of other inputs separate from the touchscreen display 18 (e.g., scrawl wheel 20c). The touchscreen display 18 and function key 20 may enable dialing digits for voice and/or data calls as well as generating selection inputs, for example, as may be inputted by the user based on a displayed menu or as a cursor control and selection of a highlighted item on a displayed screen. The touchscreen display 18 and function key 20 are the physical elements providing a textual or graphical user interface.

The key input sectors 12, 14 may be small, separated sectors, as shown in FIGS. 3A and 3B, or the key input sectors 12, 14 may join to form a larger sector (not shown). As illustrated, the key input sectors 12, 14 are smaller than a traditional keyboard input, allowing for more real estate on the touchscreen display 18. The key input sectors 12, 14 may be displayed at locations for touch by the user's thumbs and may be curved to approximately follow outer perimeters of the user's thumbs. Curvature may be ovoid, over approximately 270° with substantially straight portions over two edges, as illustrated, or curvature may form a greater or lesser portion of the boundary of key input sectors 12, 14. The data characters 16 may be displayed in curved bands formed substantially radially from a center of curvature, as illustrated. Such configuration of key input sectors 12, 14 and data characters 16 may allow the user to quickly scroll side to side and up and down in each of the key input sectors 12, 14 independently at the same time, allowing for rapid succession selection of data characters 16.

The key input sectors 12, 14 may be manipulated by software programming to change size, shape, and/or positioning on the touchscreen display 18. Depending on the software program associated with the mobile station 10 and/or the particular application in use at a particular time, the key input sectors 12, 14 may be oriented in a horizontal-type manner, as illustrated in FIG. 3A, or in a vertical-type manner as illustrated in FIG. 3B. Finally, key input sectors 12, 14 may be minimized or hidden when not in use.

Data characters 16 may be any type of character, including numerals, letters, symbols, punctuation marks, words, or any other representation useful for the input of data. The displayed representations of the data characters 16 may be a visual output (e.g., Light Emitting Diode (LED) or Organic Light Emitting Diode (OLED)) on the touchscreen display 18. The displayed representations may include representations of data characters of a full QWERTY alphabetic keyboard, displaying upper case letters, lower case letters, or both. Alternatively, or additionally, the displayed representations may include numbers, symbols, or other data characters.

Figure 4:
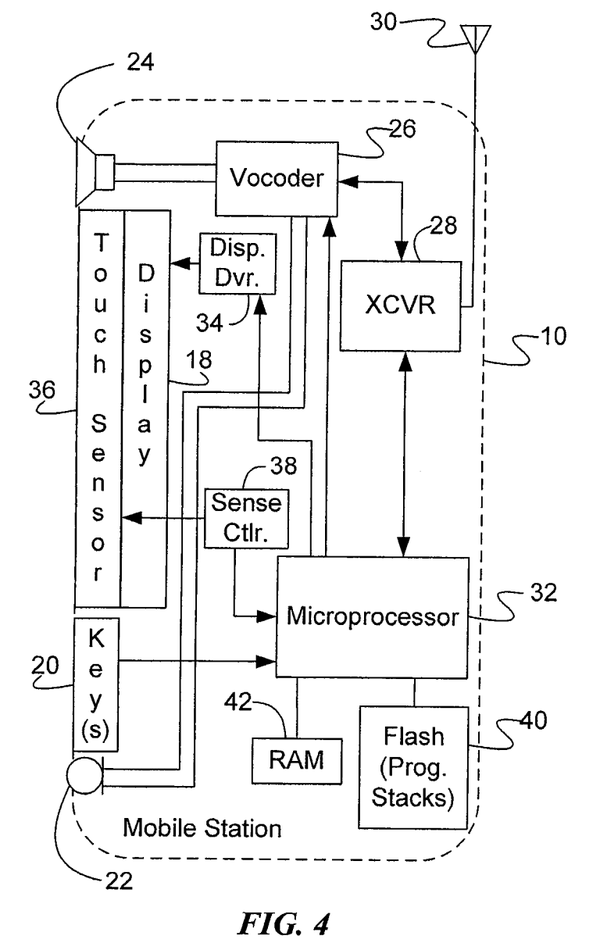
FIG. 4 is a high-level functional block diagram of an exemplary touchscreen type mobile station as may utilize the user interface in conjunction with a network/system like that shown in FIG. 5.

Those skilled in the art presumably are familiar with the structure, programming and operations of the various type of mobile stations. However, for completeness, it may be useful to consider the functional elements/aspects of an exemplary mobile station 10, at a high-level. The following description of the structure and operation of the mobile station 10 is by way of example, only. For purposes of such a discussion, FIG. 4 provides a block diagram illustration of an exemplary touchscreen type mobile station 10. The handset example of the mobile station 10 functions as a normal digital wireless telephone station. For that function, the mobile station 10 includes a microphone 22 for audio signal input and a speaker 24 for audio signal output. The microphone 22 and speaker 24 connect to voice coding and decoding circuitry (VOCODER) 26. For a voice telephone call, for example, the VOCODER 26 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 10 also includes at least one digital transceiver 28. Today, the mobile station 10 would be configured for digital wireless communications using one or more of the common network technology types. The concepts discussed here encompass examples of the mobile station 10 utilizing any digital transceivers that conform to current or future developed digital wireless communication standards. The mobile station 10 may also be capable of analog operation via a legacy network technology.

The transceiver 28 provides two-way wireless communication of information, such as vocoded speech samples and/or digital information, in accordance with the technology of the network. The transceiver 28 also sends and receives a variety of signaling messages in support of the various voice and data services provided via the mobile station 10 and the communication network. Each transceiver 28 connects through radio frequency (RF) send and receive amplifiers (not separately shown) to an antenna 30. The transceiver may also support various types of mobile messaging services, such as short message service (SMS), enhanced messaging service (EMS) and/or multimedia messaging service (MMS).

The touchscreen display 18 and function key 20 may enable dialing digits for voice and/or data calls as well as generating selection inputs, for example, as may be inputted by the user using the methods described herein. The touchscreen display 18 and function key 20 are the physical elements providing a textual or graphical user interface. Various combinations of the touchscreen display 18, function key 20, microphone 22 and speaker 24 may be used as the physical input output elements of the graphical user interface (GUI), for multimedia (e.g., audio and/or video) communications. Other user interface elements may be used, such as a trackball, as in some types of PDAs or smart phones.

Hence, the exemplary mobile station 10 includes a touchscreen display 18, which a microprocessor 32 controls via a display driver 34, to present visible outputs to the device user. The mobile station 10 also includes a touch/position sensor 36 and a function key sensor (not shown). The sensor 36 is relatively transparent, so that the user may view the information presented on the touchscreen display 18. A sense circuit 38 senses signals from elements of the touch/position sensor 36 and detects occurrence and position of each touch of the screen formed by the touchscreen display 18 and sensor 36. The sense circuit 38 provides touch position information to the microprocessor 32, which can correlate that information to the information currently displayed via the touchscreen display 18, to determine the nature of user input via the screen. The key sensor (not shown) detects occurrence of activation of the function key 20 and provides function key activation information to the microprocessor 32, which can then correlate the detected user touch to the touchscreen display 18 and user activation of the function key 20 as the user input data.

In addition to normal telephone and data communication related input/output (including message input and message display functions), the user interface elements also may be used for display of menus and other information to the user and user input of selections, including any needed during input of data by the user.

The microprocessor 32 serves as a programmable controller for the mobile station 10, in that it controls all operations of the mobile station 10 in accord with programming that the microprocessor 32 executes, for all normal operations, and for operations involved in the data input procedure under consideration here. In the example, the mobile station 10 includes flash type program memory 40, for storage of various software or firmware program routines and mobile configuration settings, such as mobile directory number (MDN) and/or mobile identification number (MIN), etc. The mobile station 10 may also include a non-volatile random access memory (RAM) 42 for a working data processing memory. Other storage devices or configurations may be added to or substituted for those in the example. In a present implementation, the flash type program memory 40 stores firmware such as a boot routine, device driver software, an operating system, call processing software and VOCODER control software, and any of a wide variety of other applications, such as client browser software and short message service software. The memories 40, 42 also store various data, such as telephone numbers and server addresses, downloaded data such as multimedia content, and various data input by the user. Programming stored in the flash type program memory 40, sometimes referred to as "firmware," is loaded into and executed by the microprocessor 32.

As outlined above, the mobile station 10 includes a processor, and programming stored in the flash type program memory 40 configures the processor so that the mobile station is capable of performing various desired functions, including in this case the functions involved in the methods described above with respect to FIGS. 1 and 2.

Figure 5:
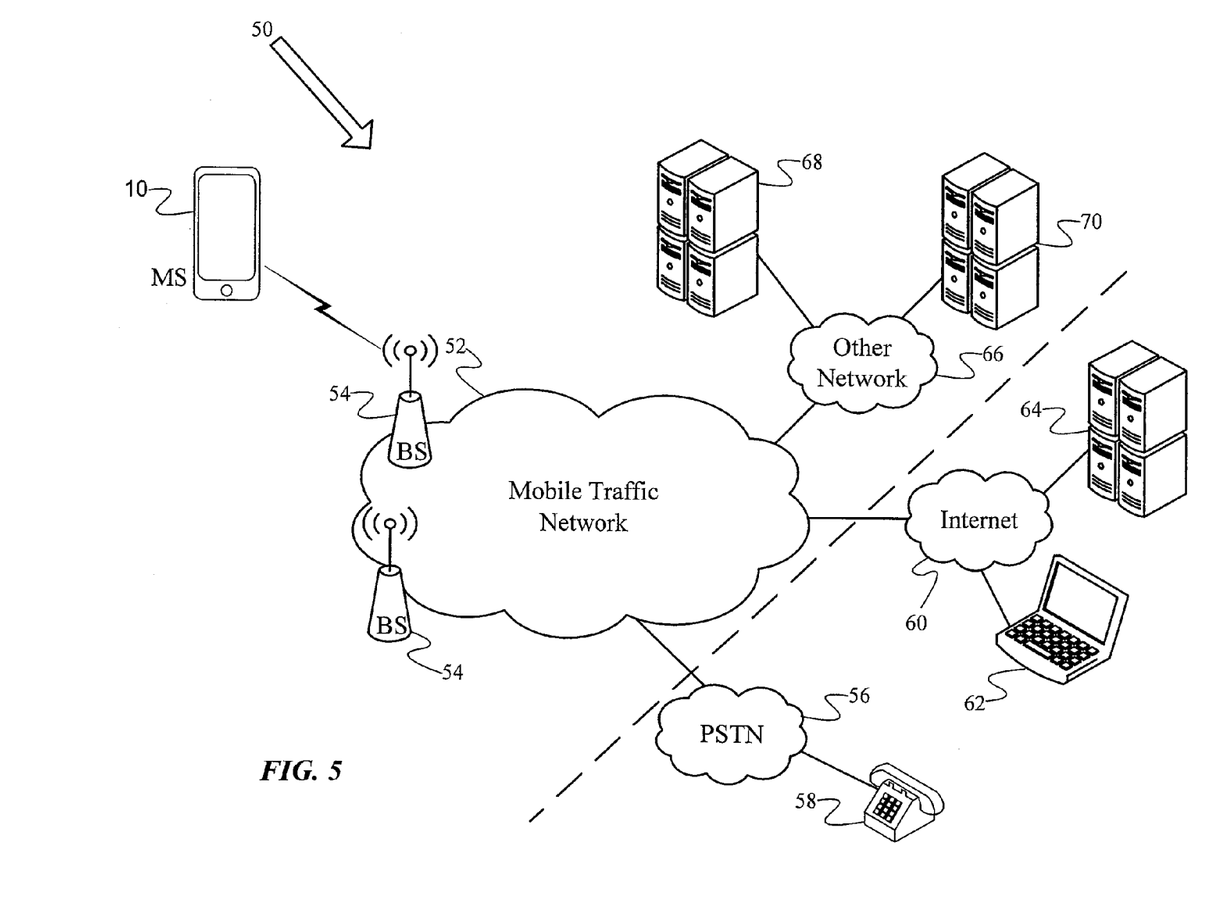
FIG. 5 is a high-level functional block diagram of an example of a system of networks/devices that provide various communications for mobile stations.

As shown by the above discussion, functions relating to the an enhanced data input experience, via a graphical user interface of a mobile station may be implemented on computers connected for data communication via the components of a packet data network, as shown in FIG. 5. Although special purpose devices may be used, such devices also may be implemented using one or more hardware platforms intended to represent a general class of data processing device commonly used to run server programming so as to implement the functions discussed above, albeit with an appropriate network connection for data communication.

As known in the data processing and communications arts, a general-purpose computer typically includes a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data, e.g. files used for the data character selection. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for data input, in essentially the manner performed in the implementations discussed and illustrated herein.

FIG. 5 illustrates a system 50 offering a variety of mobile communication services, including communications by mobile station users. The example shows a single mobile station 10 as well as a mobile communication network 52. The station 10 is an example of a mobile station that may be used for various mobile services. However, the network will provide similar communications for many other similar users. The network 52 provides mobile wireless communications services to the mobile station 10 as well as to other mobile stations (not shown), for example, via a number of base stations 54. The present techniques may be implemented in any of a variety of available mobile networks 52 and/or on any type of mobile station compatible with such a network 52, and the drawing shows a very simplified example of a few relevant elements of the network 52 for purposes of discussion here.

The wireless mobile communication network 52 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 10 may be capable of voice telephone communications through the network 52, the exemplary mobile station 10 is capable of data communications through the particular type of network 52 (and the users thereof typically will have subscribed to data service through the network).

The network 52 allows users of the mobile stations such as 10 (and other mobile stations not shown) to initiate and receive telephone calls to each other as well as through the public switched telephone network or "PSTN" 56 and telephone stations 58 connected to the PSTN. The network 52 typically offers a variety of data services via the Internet 60, such as downloads, web browsing, email, etc. By way of example, the drawing shows a laptop PC type user terminal 62 as well as a server 64 connected to the Internet 60; and the data services for the mobile station 10 via the Internet 60 may be with devices like those shown at 64 and 62 as well as with a variety of other types of devices or systems capable of data communications through various interconnected networks. The mobile station 10 of the user can receive and execute applications written in various programming languages.

Mobile station 10 can take the form of a portable handset, smart-phone or personal digital assistant, although mobile station 10 may be implemented in other form factors. Program applications, including an application to assist in the input of data can be configured to execute on many different types of mobile stations 10. For example, a mobile station application can be written to execute on a binary runtime environment for mobile (BREW-based) mobile station, a Windows Mobile based mobile station, Android, I-Phone, Java Mobile, or RIM based mobile station such as a Black-Berry or the like. Some of these types of devices can employ a multi-tasking operating system.

The mobile communication network 52 can be implemented by a number of interconnected networks. Hence, the overall network 52 may include a number of radio access networks (RANs), as well as regional ground networks interconnecting a number of RANs and a wide area network (WAN) interconnecting the regional ground networks to core network elements. A regional portion of the network 52, such as that serving mobile station 10, can include one or more RANs and a regional circuit and/or packet switched network and associated signaling network facilities.

Physical elements of a RAN operated by one of the mobile service providers or carriers, include a number of base stations represented in the example by the base stations 54. Although not separately shown, such a base station 54 can include a base transceiver system (BTS), which can communicate via an antennae system at the site of base station and over the airlink with one or more mobile stations 10, when the mobile station 10 is within range. Each base station can include a BTS coupled to several antennae mounted on a radio tower within a coverage area often referred to as a "cell." The BTS is the part of the radio network that sends and receives RF signals to/from the mobile station 10 that is served by the base station 54.

The radio access networks can also include a traffic network represented generally by the cloud at 52, which carries the user communications and data for the mobile station 10 between the base stations 54 and other elements with or through which the mobile stations communicate. The network can also include other elements that support functionality other than device-to-device media transfer services such as messaging service messages and voice communications. Specific elements of the network 52 for carrying the voice and data traffic and for controlling various aspects of the calls or sessions through the network 52 are omitted here form simplicity. It will be understood that the various network elements can communicate with each other and other aspects of the mobile communications network 52 and other networks (e.g., the PSTN and the Internet) either directly or indirectly.

The carrier will also operate a number of systems that provide ancillary functions in support of the communications services and/or application services provided through the network 52, and those elements communicate with other nodes or elements of the network 52 via one or more private IP type packet data networks 66 (sometimes referred to as an Intranet), i.e., a private networks. Generally, such systems are part of or connected for communication via the private network 66. A person skilled in the art, however, would recognize that systems outside of the private network could serve the same functions as well. Examples of such systems, in this case operated by the network service provider as part of the overall network 52, which communicate through the intranet type network 66, include one or more application servers 68 and a related authentication server 70 for the application service of application server 68.

The mobile station 10 communicates over the air with a base station 54 and through the traffic network 52 for various voice and data communications, e.g. through the Internet 60 with a server 64 and/or with application server 68. If the mobile service carrier offers a particular service, the service may be hosted on a carrier operated application server 68, for communication via the networks 52 and 66. Alternatively, the particular service may be provided by a separate entity (alone or through agreements with the carrier), in which case, the service may be hosted on an application server such as server 64 connected for communication via the networks 52 and 60. Servers such as 64 and 68 may provide any of a variety of common application or service functions in support of or in addition to an application program running on the mobile station 10. However, for purposes of further discussion, we will focus on functions thereof in support of the mobile service. For a given service, an application program within the mobile station may be considered as a client and the programming at 64 or 68 may be considered as the server application for the particular service.

To insure that the application service offered by application server 68 is available to only authorized devices/users, the provider of the application service also deploys an authentication server 70. The authentication server 70 could be a separate physical server as shown, or authentication server 70 could be implemented as another program module running on the same hardware platform as the application server 68. When the application server (server 68 in our example) receives a service request from a client application on a mobile station 10, the server application provides appropriate information to the authentication server 70 to allow authentication server 70 to authenticate the mobile station 10 as outlined herein. Upon successful authentication, the authentication server 70 informs the application server 68, which in turn provides access to the service via data communication through the various communication elements (e.g. 66, 52 and 54) of the system 50. A similar authentication function may be provided for other service(s) offered via the server 64, either by the authentication server 70 if there is an appropriate arrangement between the carrier and the operator of server 64, by a program on the server 64 or via a separate authentication server (not shown) connected to the Internet 60.

The user interface and various services using the interface for data input, under consideration here, may be implemented on touchscreen type mobile stations. Implementation of the interface and associated service(s) will involve at least some execution of programming in the mobile stations as well as implementation of user input/output functions and data communications through the network 52, from the mobile stations. For programmable type touchscreen stations, the programming may be pre-installed in the mobile stations or the programming may be downloaded to and/or stored in the mobile stations from other platforms, either for an initial installation or to upgrade previously installed programming.

Figures 6, 7:
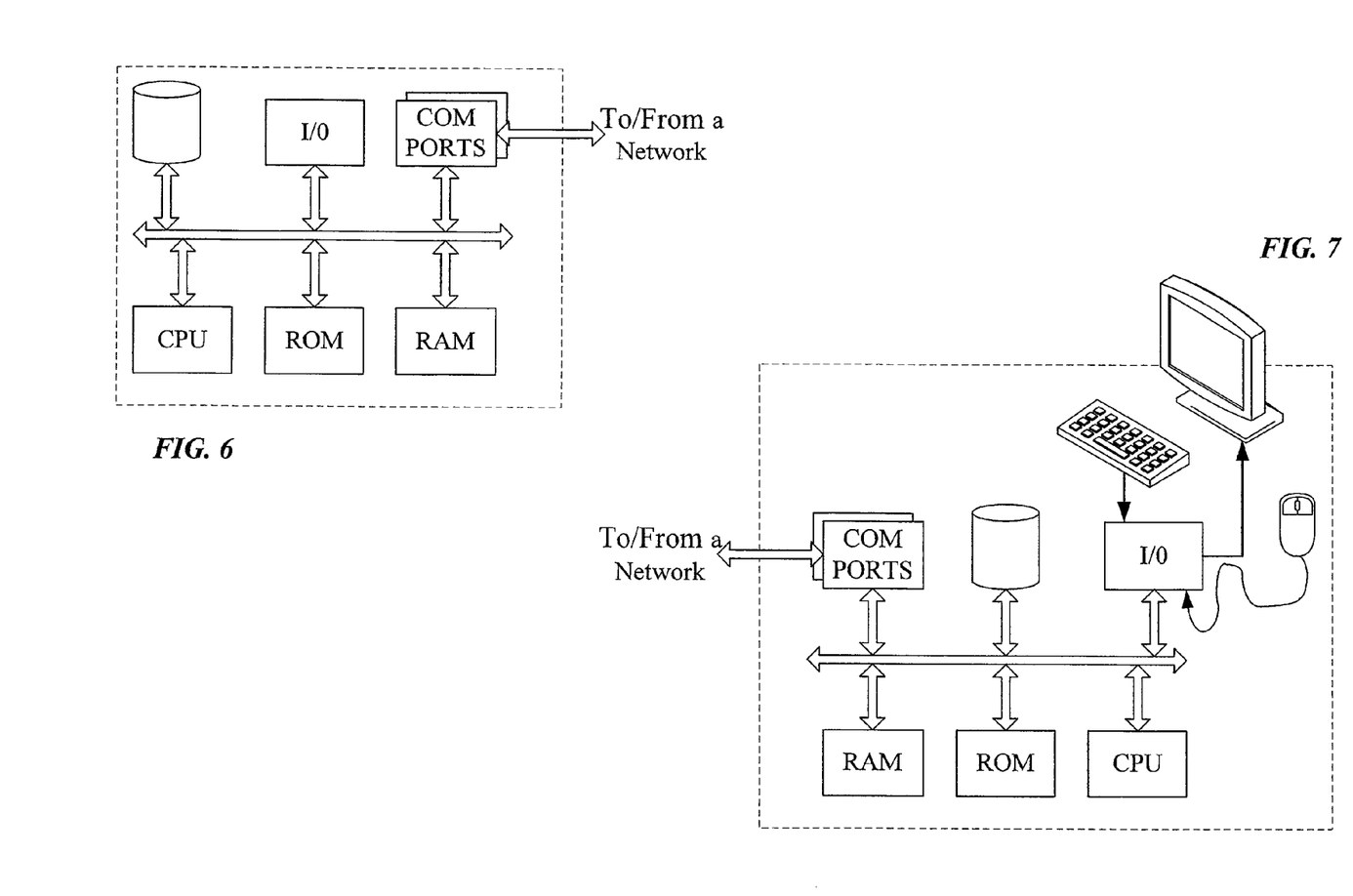
FIG. 6 is a simplified functional block diagram of a computer that may be configured as a host or server, for example, to download user interface programming to the mobile station in the system of FIG. 5.
FIG. 7 is a simplified functional block diagram of a personal computer or other work station or terminal device, although the computer may be used as a server or other device to enable configuration of the mobile station.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. Of note here, a server may provide user interface software for configuring a mobile station to implement data input technique discussed above, through the network, or a terminal device may obtain the interface software from the Internet or from a disk for loading into a mobile station connected to or in wireless communication with the terminal device. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute processing load.

Hence, aspects of the methods of data input methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the mobile station 10. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile stations, etc. shown in the drawings. Volatile storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during RF and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP2-3rd Generation Partnership Project 2
BREW—Binary Runtime Environment for Mobile
BTS—Base Transceiver System
CDMA—Code Division Multiple Access
CD-ROM—Compact Disc Read Only Memory
CPU—Central Processing Unit
DVD—Digital Video Disc
DVD-ROM—Digital Video Disc Read Only Memory
EEPROM—Electrically Erasable Programmable Read Only Memory
EMS—Enhanced Messaging Service
EPROM—Erasable Programmable Read Only Memory
EVDO—Evolution Data Optimized
FLASH-EPROM—Flash Erasable Programmable Read Only Memory
GUI—Graphical User Interface
GSM—Global System for Mobile
IR—Infrared
LED—Light Emitting Diode
MDN—Mobile Directory Number
MMS—Multimedia Messaging Service
MIN—Mobile Identification Number
OLED—Organic Light Emitting Diode
PC—Personal Computer
PDA—Personal Digital Assistant
PROM—Programmable Read Only Memory
PSTN—Public Switched Telephone Network
RAM—Random Access Memory
RAN—Random Access Network
RIM—Research In Motion
RF—Radio Frequency
ROM—Read Only Memory
SMS—Short Messaging Service
TDMA—Time Division Multiple Access
VOCODER—Voice Coding and Decoding Circuitry
WAN—Wide Area Network

What is claimed is:

1. A method of receiving user input of data on a mobile station having a touchscreen display and a function key separate from the touchscreen display, comprising steps of:
    simultaneously displaying at least two separate key input sectors, each displayed sector including displayed representations of a plurality of data characters available for user input, and each displayed sector being spatially separated from the other by a distance greater than a distance between the display representation of adjacent data characters within the sectors, such that the two key input sectors are visually separate and distinct,
    wherein the first and second key input sectors are displayed at locations for touch by the user's thumbs, have a predetermined size, and have a predetermined shape that is curved to approximately follow outer perimeters of the users' thumbs and to display the data characters in curved bands, and
    wherein at least one of the size and the shape of the first and second key input sectors is able to be changed by the mobile station;
    sensing touch of a user's digit at a location on the touchscreen display corresponding to one of the data characters displayed in one of the key input sectors;
    responsive to the sensed touch, highlighting the displayed representation of the data character at the displayed location in the one of the key input sectors displayed on the touchscreen display;
    while the data character is highlighted, sensing user activation of the function key, as the user's selection of the data character at the displayed location of the sensed touch; and
    processing data corresponding to the selected data character, as the user input data.

2. The method of claim 1, wherein the displayed representations of data characters in the key input sectors include at least representations of data characters of a full QWERTY alphabetic keyboard.

3. The method of claim 1, wherein the key input sector comprises a first key input sector and wherein the data character comprises a first data character, the method further comprising steps of:
    sensing another touch of one of the user's digits at a location on the touchscreen display corresponding to a second data character displayed in a second key input sectors;
    responsive to the sensed touch, highlighting the display of the second data character at the displayed location in the second key input sector displayed on the touchscreen display;
    while the second data character is highlighted, sensing user activation of the function key, as the user's selection of the second data character; and processing data corresponding to the selected second data character, as another user input data.

4. The method of claim 3, wherein at least some of the steps performed with regard to the second key input sector and the second data character overlap in time with performance of the steps with regard to the first key input sector and the first data character.

5. The method of claim 1, wherein the step of displaying key input sectors comprises:
   displaying a first key input sector at a first location on the touchscreen display for touch by a digit of the user's left hand; and
   displaying a second key input sector at a second location on the touchscreen display for touch by a digit of the user's right hand.

6. The method of claim 1, further comprising:
   sensing a user input of a command to change the data characters represented on the key input sectors; and
   in response to the sensed command, displaying in each key input sector representations of a different plurality of data characters.

7. The method of claim 6, further comprising steps of:
   sensing touch of a user's digit at a location on the touchscreen display corresponding to a different data character, from among the different plurality of data characters displayed in one of the key input sectors;
   responsive to the sensed touch, highlighting the display of the different data character;
   while the different data character is highlighted, sensing user activation of the function key, as the user's selection of the different data character; and
   processing data corresponding to the selected different data character, as user input data.

8. The method of claim 7, wherein representations of the different plurality of data characters relate to characters of a different language.

9. The method of claim 7, wherein representations of the different plurality of data characters relate to in a different case.

10. The method of claim 1, wherein at least one of:
    the at least one of the size and shape are able to be changed by the mobile device based on an application running on the mobile device, or
    the displayed data characters are able to be changed by the mobile device based on the application running on the mobile device.

11. A mobile station comprising:
    a touchscreen display configured to display representations of data characters and detect occurrence and position of a user touch to the touchscreen display;
    a first function key separate from the touchscreen display;
    a second function key separate from the touchscreen display;
    a processor configured to correlate detected user touch to the touchscreen display and user activation of at least one of the function keys as user input; and
    a machine readable non-transitory storage medium bearing programming instructions for the processor to configure the mobile station to:
    (a) simultaneously display, on the touchscreen display, at least two separate key input sectors, each displayed sector including displayed representations of a plurality of data characters available for user input, and each displayed sector being spatially separated from the other by a distance greater than a distance between the display representation of adjacent data characters within the sectors, such that the two key input sectors are visually separate and distinct,
        wherein the first and second key input sectors are displayed at locations for touch by a user's digits, have a predetermined size, and have a predetermined shape that is curved to approximately follow outer perimeters of the users' digits and to display the data characters in curved bands, and
        wherein at least one of the size and the shape of the first and second key input sectors is able to be changed by the mobile station;
    (b) detect touch of the user's digit at a location on the touchscreen display corresponding to one of the data characters displayed;
    (c) responsive to the sensed touch, display a highlighted representation of the data character at the sensed location on the touchscreen display;
    (d) while the data character is highlighted, detect user activation of at least one of the function keys, as the user's selection of the data character at the location of the sensed touch; and
    (e) correlate, with the processor, the touch of the touchscreen and the activation of the at least one of the function keys as user input data, and select the highlighted character for processing,
        wherein the first function key is configured to, activate a plurality of the displayed data characters; and
        wherein the second function key is configured to, upon user activation, select as an input another data character being touched by the user, the another data character being one of activate another plurality of the displayed data characters that are different from the plurality of data characters selected by the first function key.

12. The mobile station of claim 11, wherein at least one of:
    at least one of the first function key or the second function key perform shift functions to change at least some of the displayed data characters, or
    the first function key and the second function key have different mechanisms for activating the displayed data characters.

13. A method of entering data into a mobile station having a touchscreen display, comprising steps of:
    simultaneously displaying, on the touchscreen display, at least two separate key input sectors, each displayed sector including displayed representations of a plurality of data characters available for user input, and each displayed sector being spatially separated from the other by a distance greater than a distance between the display representation of adjacent data characters within the sectors, such that the two key input sectors are visually separate and distinct,
        wherein the first and second key input sectors are displayed at locations for touch by a user's digits, have a predetermined size, and have a predetermined shape that is curved to approximately follow outer perimeters of the users' digits and to display the data characters in curved bands, and
        wherein at least one of the size and the shape of the first and second key input sectors is able to be changed by the mobile station;
    highlighting a first data character displayed on the touchscreen display in response to detecting a user touching, with a first digit, the location on the touchscreen display where the first data character is displayed;

selecting the highlighted data character as a first data character input for processing, in response to the user activating a first function key separate from the touchscreen display while the first data character is highlighted;

highlighting a second data character displayed on the touchscreen display in response to detecting the user touching, with a second digit, the second data character that is displayed; and selecting the second highlighted data character as a second data character input for processing, in response to the user activating a second function key while the second data character is highlighted.

14. The method of claim 13, further comprising the steps of:

highlighting a third data character displayed on the touchscreen display in response to detecting the user sliding the second digit and touching with the second digit, at the location on the touchscreen where the third data character is displayed; and selecting the highlighted third data character as a third data character input, in response to the user activating the second function key while the third data character is highlighted.

15. The mobile station of claim 11, wherein the first function key is positioned on the mobile device in proximity to the plurality of the displayed data characters to be activated by a first index finger, and the second function key is positioned on the mobile device in proximity to the other plurality of the displayed data characters to be activated by a second index finger.

16. The method of claim 13, wherein at least one of:

at least one of the first function key or the second function key perform shift functions to change at least some of the displayed data characters, or the first function key and the second function key have different mechanisms for activating the displayed data characters.

17. The method of claim 13, wherein the first function key is positioned on the mobile device in proximity to the first data character and is activated by a first index finger, and the second function key is positioned on the mobile device in proximity to the second data character and is activated by a second index finger.

18. A method of receiving user input of data on a mobile station having a touchscreen display, a sensor and a processor, the method comprising steps of:

simultaneously displaying, by the touchscreen display, two separate key input sectors, each displayed sector being for touch by a respective digit of each of the user's hands, each displayed sector being curved to approximately follow an outer perimeter of the respective digit, each displayed sector including displayed representations of a plurality of data characters available for user input by touch with the respective digit, and each displayed sector being spatially separated from the other by a distance greater than a distance between the display representation of adjacent data characters within the sectors, such that the two key input sectors are visually separate and distinct, wherein the first and second key input sectors are displayed at locations for touch by the user's thumbs, have a predetermined size, and have a predetermined shape that is curved to approximately follow outer perimeters of the users' thumbs and to display the data characters in curved bands, and wherein at least one of the size and the shape of the first and second key input sectors is able to be changed by the mobile station;

sensing, by the sensor, touch of a user's digit at a location on the touchscreen display corresponding to one of the data characters displayed in one of the key input sectors;

responsive to the sensed touch, highlighting, by the processor, the displayed representation of the data character at the displayed location in the one of the key input sectors displayed on the touchscreen display;

while the data character is highlighted, sensing a further user activation of the mobile station, as the user's selection of the data character at the displayed location of the sensed touch; and processing, by the processor, data corresponding to the selected data character, as the user input data.

19. The method of claim 18, wherein the sensing step comprises sensing user activation of a function key, the function key being separate from the touchscreen display on the mobile station.

20. The method of claim 18, wherein at least one of:

the at least one of the size and shape are able to be changed by the mobile device based on an application running on the mobile device, or the displayed data characters are able to be changed by the mobile device based on the application running on the mobile device.

\* \* \* \* \*